United States Patent [19]

Mizokawa et al.

[11] 4,401,365
[45] Aug. 30, 1983

[54] ROTARY TYPE OPTICAL SWITCH

[75] Inventors: Sadao Mizokawa; Yoshiji Ito, both of Hitachi; Yasuo Hosoda, Tokaimura; Hiroshi Kaita; Tadaaki Okada, both of Hitachi; Hiroaki Ohnishi, Tokaimura; Seiichi Yasumoto; Hitoshi Fushimi, both of Hitachi; Jushi Ide, Mito; Hiroshi Kuwahara, Hitachi, all of Japan

[73] Assignee: Hitachi, Ltd., Tokyo, Japan

[21] Appl. No.: 232,193

[22] Filed: Feb. 6, 1981

[30] Foreign Application Priority Data

Feb. 8, 1980 [JP] Japan ................ 55-15312
Feb. 8, 1980 [JP] Japan ................ 55-15313

[51] Int. Cl.³ ............................... G02B 5/14
[52] U.S. Cl. ............................... 350/96.20
[58] Field of Search ............ 350/96.20; 250/227, 250/229, 233; 340/365 P

[56] References Cited

U.S. PATENT DOCUMENTS

| | | | |
|---|---|---|---|
| 3,334,237 | 4/1967 | Dodsworth et al. | 250/227 |
| 3,519,116 | 7/1970 | Koehn | 340/365 P |
| 3,573,471 | 4/1971 | Kolb | 350/96.20 |
| 3,989,943 | 11/1976 | Campbell | 250/233 |

Primary Examiner—David K. Moore
Attorney, Agent, or Firm—Antonelli, Terry & Wands

[57] ABSTRACT

Disclosed is an optical switch of the rotary-type in which a pair of opposing optical transmission path mounting members are disposed on the same axis.

A plurality of junction faces of optical transmission paths disposed on the respective opposing plane portions of the mounting members along phantom circles which are opposite to each other and concentric with the pair of mounting members respectively with respect to the axis so that the junction faces on the respective plane portions are capable of being correspondingly opposite to each other.

When the pair of the mounting members are relatively rotated about the axis, the facing mates of the opposing junction faces of the optical transmission paths are changed over to switch the optical transmission paths.

In the case where an optical path relay member is interposed between the pair of the optical transmission path mounting members, the optical transmission paths can be switched by only the rotation of the optical path relay member.

2 Claims, 26 Drawing Figures

F I G. 7A
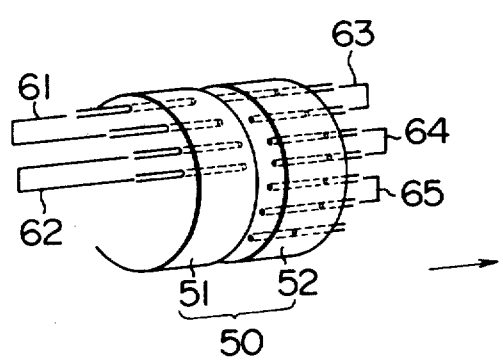
F I G. 7B
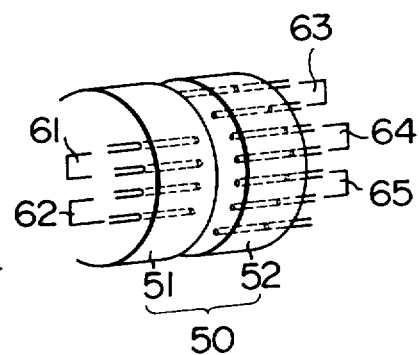
F I G. 8A
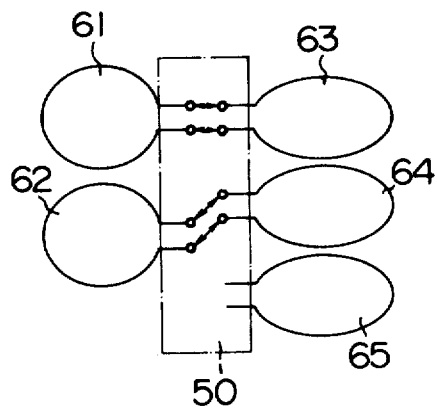
F I G. 8B
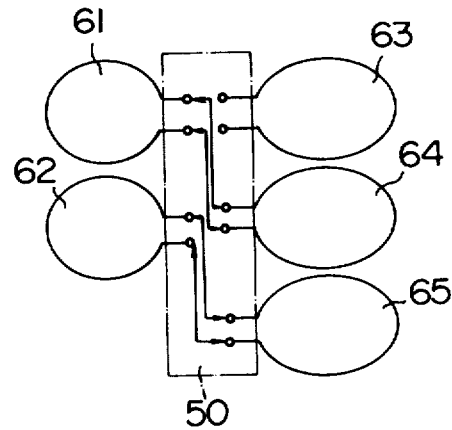

ROTARY TYPE OPTICAL SWITCH

BACKGROUND OF THE INVENTION

1. Field of the Invention

The present invention relates to an optical switch for switching-over, disconnecting, or connecting optical transmission paths. A typical example of the optical transmission path is the optical fiber. The optical fiber is superior in insulation to electrical conductor wires and not affected by electromagnetic induction, so that it has been used in various fields according as its cost lowers. Its applications have widely developed in various fields, such as, mass communications, power systems, manufacturing processes in various industrial plants for producing steel and so on, central control systems or remote monitoring control systems using a computer in traffic control systems, etc.

In these new fields, in order to more effectively use the optical fiber, a loop communication system in which optical fibers are connected in loop is employed. For example, a plurality of stations are connected in loop by a single optical fiber, and each of the stations is connected to a plurality of terminal devices by another separate fiber, so that each terminal device of one station may effect data transmission between the terminal device itself and a computer or another terminal device which are connected to another station through its associated station and the other station.

For the construction of such a system, optical switches such as listed below are needed.

(1) Optical switch for bypassing

This switch is used for preventing the system from being inoperative in the case where an abnormal situation occurs or where diagnosis test is performed on a station, by bypassing the station so as to form a transmission loop. This bypassing optical switch is usually provided in all the stations.

(2) Optical switch for disconnection

This switch is used for simultaneously disconnecting all the plurality of terminal devices from their associated station for the purpose of testing the station.

(3) Optical switch for reforming loop

This switch is used for dividing a transmission loop into two independent transmission loops, or, inversely, forming two independent transmission loops into a single transmission loop. This optical switch is effective when a disconnection fault occurs in a loop communication system and it is desired to maintain the transmission via the remaining transmission loop alone thus preventing the system operation from being stopped or shut down, or when it is desired extend the loop communication.

(4) Optical switch for simultaneously switching-over

This switch is used for switching-over plural optical fibers, namely for not only disconnecting a plurality of optical fibers but simultaneously connecting another plurality of optical fibers.

2. Description of the Prior Art

One of the conventional optical switches is constructed such that one end of an optical fiber is attached to an end of a movable member and this movable moved is moved to one of two other opposite optical fibers, thereby switching-over the connection of the optical fibers.

Another conventional optical switch is constructed such that a triangular prism for total reflection is provided between opposed fibers and slided to switchover the connection of the optical fibers.

When these conventional optical switches are used as the optical switches (1) to (4) as mentioned above, the following necessity and problems are caused.

For the purpose of bypassing, two optical switches must essentially be installed, one at the input side of a station and the other at the output side thereof. Moreover, the station thus bypassed needs to form a self loop via another separate optical fiber therein when bypassed. This loop is used to test or diagnose the transmitting and receiving function of the station itself. In this case, still another optical switch must be provided therefor.

For the purpose of disconnecting or simultaneous switching-over, a plurality of optical switches must be incorporated and thus a problem of space is caused.

For the purpose of reforming loops, since the switch must have four change-over contacts, the switch construction becomes complicated and causes considerable light loss at the contacts.

In the optical switch, it is important that not only the construction be simple but also the number of the change-over contacts be selected as small as possible in view of the light losses caused by the contacts.

A rotary optical switching device is disclosed in the U.S. Pat. No. 3,989,943, and this device serves to only turn on or off the optical transmission paths and cannot switch the optical transmission paths.

SUMMARY OF THE INVENTION

It is an object of the invention to provide a rotary-type optical switch having a simple construction and being capable of switching-over, disconnecting or connecting a plurality of optical transmission paths.

It is another object of the invention to provide a rotary-type optical switch with small number of change-over contacts.

It is still another object of the invention to provide a rotary-type optical switch having a simple construction and being capable of simultaneous switching-over, disconnecting or connecting a plurality of optical transmission paths.

It is a further object of the invention to provide a rotary-type optical switch which is suitable for use as an optical switch for bypassing, disconnecting, and reforming loops for the loop transmission system with optical fibers.

These objects can be achieved in accordance with the present invention.

According to this invention, there is provided a rotary-type optical switch in which a pair of optical transmission path mounting members respectively having closely opposed plane portions are aligned along an axis and supported relatively rotatably about the axis. The junction faces of plurality of optical transmission paths are disposed on the respective opposite plane portions of these mounting members along phantom circles which are opposite to each other and concentric with the respective mounting members with respect to the axis, so that when the pair of the mounting members are relatively rotated, the opposed optical transmission paths on the opposite plane portions are switched-over, disconnected or connected.

Alternatively, an optical path relay member is preferably provided on the same axis between the pair of mounting members such that the relay member, may be rotated about the axis to switch the opposed optical transmission paths on the opposite plane portions of the mounting members, without moving the pair of mounting members. In this case, the optical path relay member has optical transmission paths incorporated therein beforehand, and the opposite plane portions of the relay member are disposed close to those of the pair of mounting members respectively. Moreover, the end junction faces of the optical transmission paths which are incorporated in the optical path relay member are positioned to oppose the junction faces of the optical transmission paths on the opposite plane portions of the pair of mounting members.

BRIEF DESCRIPTION OF THE DRAWINGS

FIGS. 3A, 3B to 6A, 6B are schematic diagrams showing the applications of the rotary-type optical switch of FIG. 1.

FIGS. 7A and 7B are schematic diagrams useful for explaining an application of the rotary-type optical switch of FIG. 1.

FIGS. 8A and 8B are explanatory diagrams useful for explaining the operation of FIGS. 7A and 7B.

DESCRIPTION OF THE PREFERRED EMBODIMENTS

Figure 1:
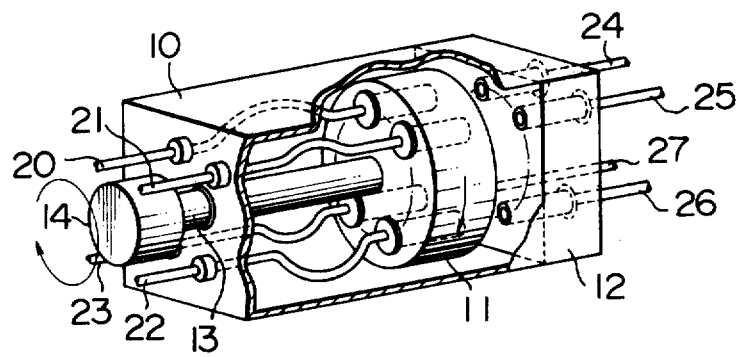
FIG. 1 is a perspective view of an embodiment of a rotary-type optical switch according to the invention.

FIG. 1 shows a specific example of a rotary-type optical switch (hereinafter simply referred to as the optical switch) of the invention.

Referring to FIG. 1, there is shown a casing 10 which houses members 11 and 12 for mounting optical fibers 20 to 23 and 24 to 27 respectively. The mounting member 12 is fixedly secured to the casing 10, while the mounting member 11 is fastened to a shaft 13 which is directly connected to a motor 14 so that the mounting member 11 is rotatable with the shaft 13 when the shaft 13 is rotated by the motor.

The mounting members 11 and 12 have respective plane portions which are closely opposite to each other and on which abutment junction faces are provided of the fibers 20 to 23 and 24 to 27, respectively. The optical fibers 20 to 27 are led outside of the casing 10 as shown in FIG. 1.

Figure 2A:
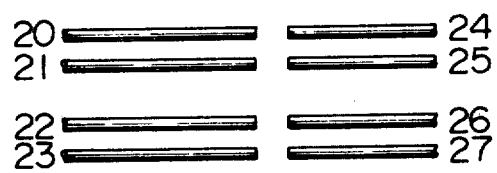
FIGS. 2A and 2B are explanatory diagrams useful for explaining the operation of the switch of FIG. 1.
Figure 2B:
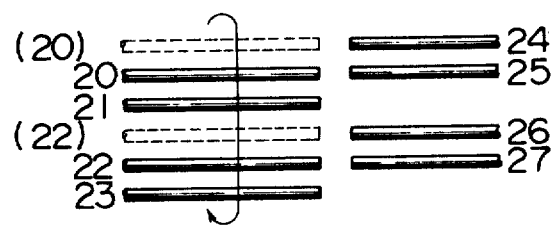

FIGS. 2A and 2B schematically show the optical fibers 20 to 27 for the purpose of explaining the operation of FIG. 1.

The connected state of the optical fibers as shown in FIG. 2A can be changed by the rotation of the mounting member 11 to the state as shown in FIG. 2B. In other words, normally the optical fiber 20 faces 24, 21 faces 25, 22 faces 26, and 23 faces 27 for constituting the respective transmission paths as shown in FIG. 2A, while when the mounting member 11 is rotated, the optical fiber 20 is changed to face 25 from 24, and 22 is changed to face 27 from 26 as shown in FIG. 2B. In this case, each of the optical fibers 21, 23, 24 and 26 faces none, and thus the optical transmission paths associated therewith have been disconnected by the switch.

FIGS. 3A, 3B and 4A, 4B schematically show the case in which the optical switch of FIG. 1 concerning the optical fibers 20, 21, 24 and 25 for convenience is employed as an optical switch for bypassing a station in a loop transmission system. The optical switch is represented by numeral 31 for the sake of convenience.

Figure 3A:
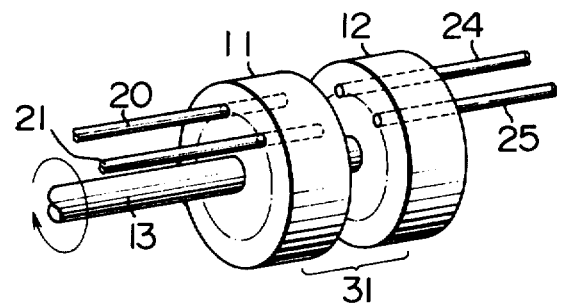

In FIG. 3A, the optical fibers 20 and 21 face optical fibers 24 and 25, respectively.

Figure 3B:
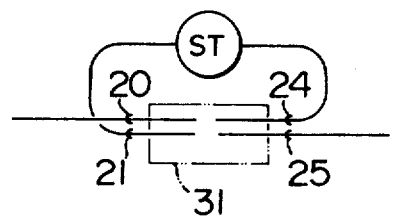

When the optical switch 31 is used as a bypassing optical switch for a station ST in a loop transmission system, the optical fibers 21 and 24 are connected to the station ST as shown in FIG. 3B. Thus, an information incoming via the optical fiber 25 is applied through the optical switch 31 and optical fiber 21 to the station ST. The information from the station ST is sent through the optical fiber 24, optical switch 31 and optical fiber 20 to another station in a succeeding stage constituting the transmission loop although not shown. That is, in the state shown in FIG. 3A, the station ST is connected to the transmission loop.

Figure 4A:
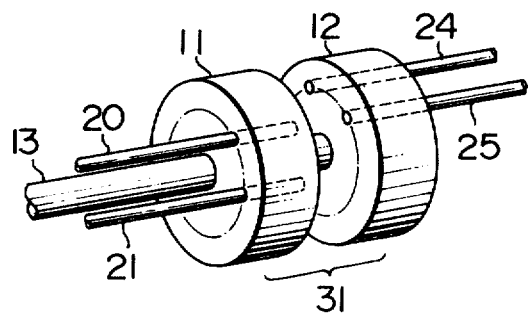
Figure 4B:
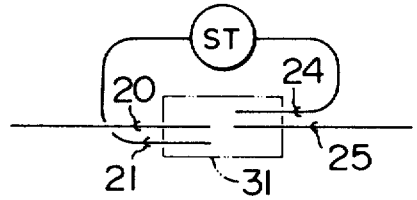

Then, when the mounting member 11 is rotated to the position as shown in FIG. 4A, only the optical fibers 25 and 20 face each other at the optical switch 31. At this time, as shown in FIG. 4B, the incoming information via the optical fiber 25 is applied through the optical switch 31 to the optical fiber 20, therefore bypassing the station ST.

In this bypassed state, only a single pair of optical fibers face each other and thus contribute to reduce the optical loss at junction faces.

Thus, by rotating the mounting member 11, the station ST connected to the transmission loop can simply be bypassed.

FIGS. 5A, 5B and 6A, 6B are schematic diagrams showing the case where the optical switch of FIG. 1 is employed as a switch for disconnecting or connecting at a time a plurality of terminal devices connected to a station through optical fibers. Here, the optical switch is represented by numeral 32.

Figure 5A:
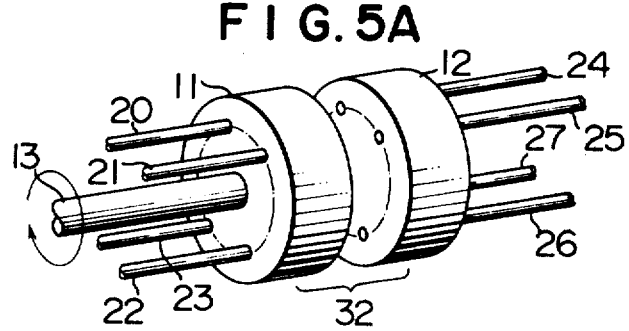
Figure 5B:
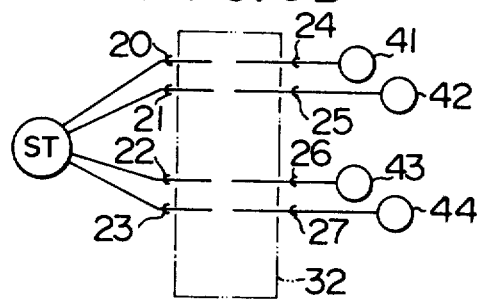

Under the condition as shown in FIG. 5A, the optical fibers 20 to 23 are opposite to the fibers 24 to 27, respectively. As shown in FIG. 5B, the station ST and terminal devices 41 to 44 are connected together via the optical switch 32.

Figure 6A:
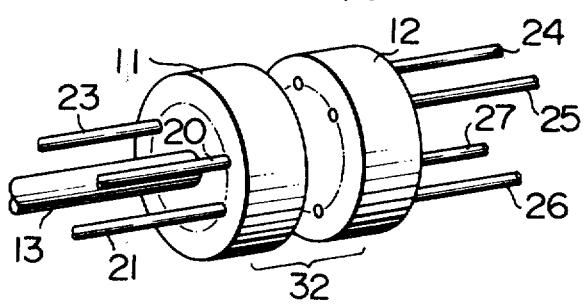
Figure 6B:
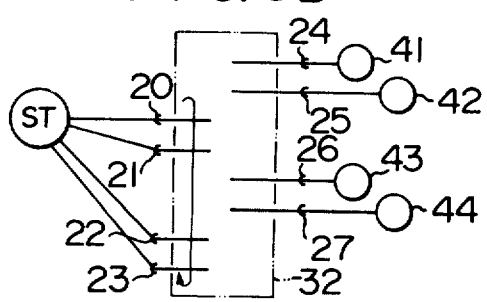

If, now, the mounting member 11 is rotated to the position as shown in FIG. 6A, the optical fibers 20 to 23 become facing none, and therefore the terminal devices 41 to 44 are disconnected from the station ST as shown in FIG. 6B. In other words, by rotating the mounting member 11 a plurality of optical fibers (here four fibers 24 to 27) may be disconnected from the station at a time.

While the junction faces of only four optical fibers are provided on the plane portion of each mounting member along a phantom circle which is concentric with the member. Furthermore optical fibers may of course be attached to each member. Thus, the rotary-type optical switch is effective in the case where numbers of optical fibers have to be disconnected at a time.

FIGS. 7A and 7B are schematic diagrams showing the case where the optical switch of FIG. 1 is used as an optical switch for disconnecting plural pairs of optical fibers at a time. Here, the optical switch is represented by numeral 50.

FIG. 7A shows the state in which optical transmission paths 61 and 62 are connected via the optical switch 50 to optical transmission paths 63 and 64, respectively, as shown in FIG. 8A.

If, now, a mounting member 51 of mounting members 51 and 52 is rotated to the position as shown in FIG. 7B, the optical transmission paths 61 and 62 are switched over from the optical transmission paths 63 and 64 to 64 and 65, respectively, as shown in FIG. 8B. In other words, a plurality of optical transmission paths are switched over at a time.

Thus, in order to switch over a plurality of optical transmission paths at a time, it is necessary that the optical fibers have to be attached to each of the mounting members 51 and 52 in such a manner that they are arranged at a predetermined interval along a phantom circle which is concentric with the respective member, on the plane portion thereof.

Figure 9:
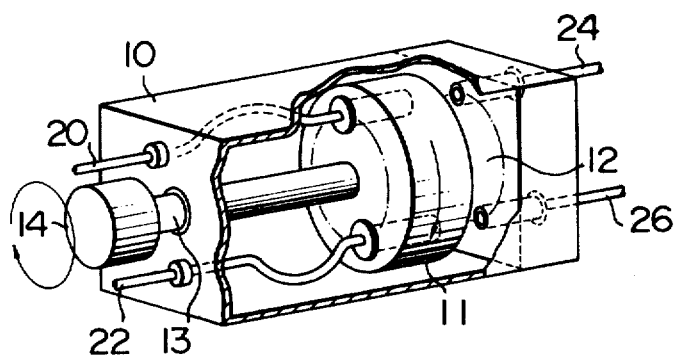
FIG. 9 is a perspective view of another embodiment of a rotary-type optical switch according to the invention.

FIG. 9 shows a rotary-type optical switch constructed such that two optical fibers 20, 22 and 24, 26 are attached on the opposite plane portions of the mounting members 11 and 12 in their diagonal lines, respectively, so that the facing optical fibers are interchanged by rotating the mounting member 11 by 180 degrees.

Figure 10A:
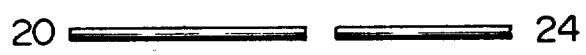
FIGS. 10A and 10B are explanatory diagrams useful for explaining the operation of FIG. 9.
Figure 10B:

As shown in FIG. 10A, the optical fibers 20 and 22 face the optical fibers 24 and 26, respectively. If the mounting member 11 is rotated by 180 degrees, however, the optical fibers 20 and 22 become facing the fibers 26 and 24, respectively, thus the facing pairs being interchanged as shown in FIG. 10B.

FIGS. 11A, 11B and 12A, 12B schematically show the case where such a switch as shown in FIG. 9 is used as an optical switch for reforming transmission loops. Here, the optical switch is represented by the reference numeral 33.

Figure 11A:
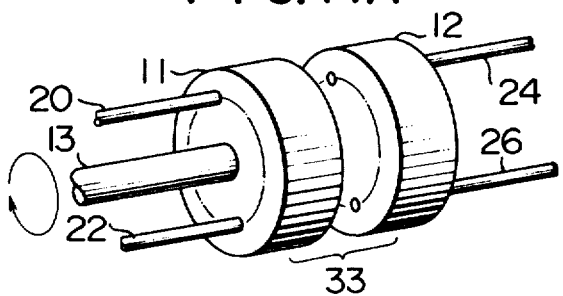
FIGS. 11A, 11B and 12A, 12B are schematic diagrams showing the applications of the rotary-type optical switch of FIG. 9.

The switch shown in FIG. 11A is in the state in which sections I and II constitute one transmission loop via the optical switch 33 by which the optical fibers 20 and 22 are opposed to the fibers 24 and 26, respectively.

Figure 12A:
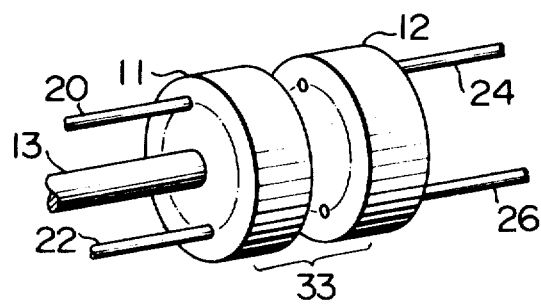
Figure 12B:
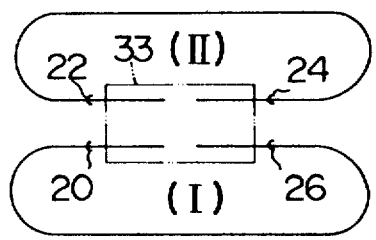

When the mounting member 11 is rotated 180 degrees by the shaft 13 to the state shown in FIG. 12A from the state of FIG. 11A, the optical fibers 22 and 20 become facing the fibers 24 and 26 respectively, thus the sections I and II constituting separate transmission loops as shown in FIG. 12B.

Figure 11B:
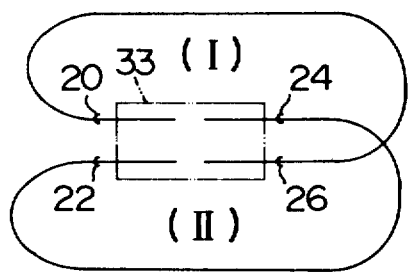

Conventionally such an optical switching operation for reforming transmission loops has been realized by optical switching means in the combination of a plurality of optical switches of the conventional type. According to the present invention, however, the use of only a single optical switch as shown in FIG. 11 can realize such a loop reforming switch. Moreover, in this case, when one transmission loop is formed by the switch 33 as shown in FIG. 11B, two change-over junctions of the optical fibers are made, and when two separate transmission loops are reformed by the switch 33, a single change-over junction is made for each loop. Thus, the optical loss at the optical switch is lowered.

While in the above embodiments one of the mounting members is fixed to the shaft and is rotated by the revolution of the shaft, the shaft may be fixed with the other mounting member made rotatable. In either case, it is necessary that the pair of mounting members be disposed on the same axial line, and that their plane portions be closely opposed and relatively rotatable.

Moreover, the shaft itself is not necessarily rotated by a motor but may be rotated manually.

Furthermore, although not shown, the movable mounting member may preferably be provided with a suitable stopper so as to facilitate the rotational positioning thereof.

Figure 13:
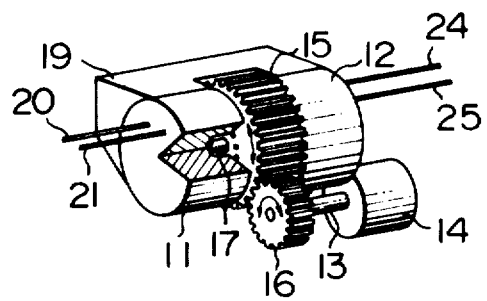
FIG. 13 is a perspective view of still another embodiment of a rotary-type optical switch according to the invention.

FIG. 13 is a perspective view of a further embodiment of a rotary-type optical switch according to the invention. In this embodiment, the mounting members 11 and 12 are disposed on the same axial line of the support shaft 17, and an optical path relay member 15 is interposed between the members 11 and 12 in a manner so as to be rotatable about the shaft 17. The rotation of the optical path relay member 15 enables the switching of the optical transmission paths. This relay member 15 is rotated by the motor 14 via a gear 16. Here, the mounting members 11 and 12 are fixedly mounted on a support stand 19.

Figure 14:
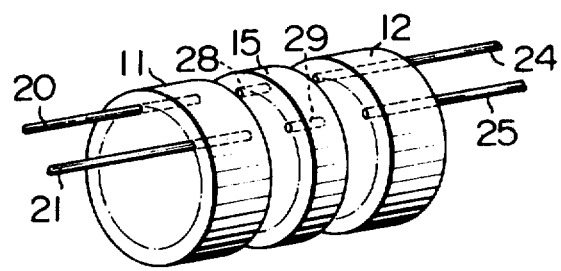
FIG. 14 is a schematic diagram showing an application of the rotary-type optical switch of FIG. 13.

FIG. 14 schematically shows the optical switch of FIG. 13. The optical path relay member 15 has optical fibers 28 and 29 incorporated beforehand therein, and has its opposite plane portions which closely face the respective plane portions of the pair of mounting members 11 and 12.

Figure 15A:
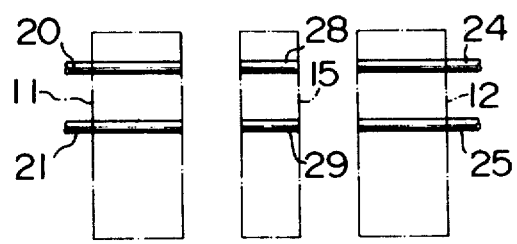
FIGS. 15A and 15B are explanatory diagrams useful for explaining the operation of FIG. 14.
Figure 15B:
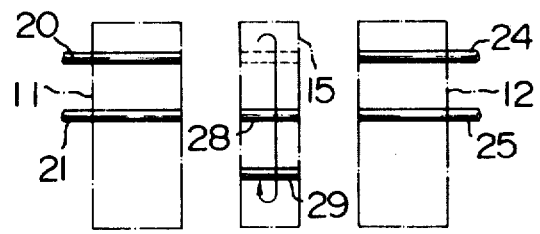

FIGS. 15A and 15B show the relationship between the optical fibers 28, 29 and optical fibers 20, 21 and 24, 25. In the state of FIG. 15A, the optical fibers 20 and 24 form an optical transmission path via the optical fiber 28 of the relay member 15, while the optical fibers 21 and 25 form another transmission path via the optical fiber 29 of the relay member 15.

If, now, the relay member 15 is rotated to the state as shown in FIG. 15B, the optical fibers 20 and 24 have no optical fiber for relaying light therebetween, and therefore disconnected from each other. On the other hand, the optical fibers 21 and 25 has the optical fiber 28 of the relay member 15 therebetween, thus keeping the optical transmission path therebetween as it was, because the optical fibers 28 and 29 are interchanged only for the insertion therebetween as compared with the state of FIG. 15A.

Therefore, the optical switch changes the state in which the two optical transmission paths are formed as shown in FIG. 15A, into the state in which only one optical transmission path is formed by the fibers 21, 28 and 25 as shown in FIG. 15B.

Moreover, if the relay member 15 is reversely rotated from the condition of FIG. 15A, the two optical transmission paths are changed over to only one transmission path formed by the optical fibers 20, 29 and 24.

In the optical switch of FIG. 13, the optical transmission paths incorporated in the relay member 15 may be modified by using curved optical fibers instead of the straight ones as shown in FIGS. 14, 15A and 15B so as to realize different kinds of optical switches.

What is claimed is:

1. A rotary-type optical switch for switching optical transmission paths by changing-over facing mates of opposing junction faces of optical transmission paths, said switch comprising:
   (A) a pair of optical transmission path mounting members aligned along an axis, with their respective plane portions which are opposite to each other;
   (B) a plurality of junction faces of optical transmission paths disposed on said respective plane portions along phantom circles which are opposite to each other and concentric which said pair of mounting members respectively with respect to said axis so that the junction faces on said respective plane portions are capable of being correspondingly opposite to each other;

(C) an optical path relay member interposed between said pair of mounting members such that it is rotatable about said axis, and having opposite plane portions close to said respective plane portions of said pair of mounting members, and a plurality of optical transmission paths incorporated therein, the junction faces on the opposite plane portions of said optical transmission paths of said optical path relay member being capable of being correspondingly opposite to those on said respective plane portions of said pair of mounting members; and (D) a supporting stand to which said pair of mounting members are fixedly attached.

2. A rotary-type optical switch according to claim 1, wherein said optical path relay member is rotated by a gear connected directly to a motor.

* * * * *